United States Patent [19]

Taylor

[11] Patent Number: 4,967,787
[45] Date of Patent: Nov. 6, 1990

[54] UNITIZED DISC FLOW CONTROL ASSEMBLY FOR A RESTRICTOR VALVE

[76] Inventor: Julian S. Taylor, 8300 SW. 8, Oklahoma City, Okla. 73128

[21] Appl. No.: 474,979

[22] Filed: Feb. 5, 1990

Related U.S. Application Data

[63] Continuation-in-part of Ser. No. 303,434, Jan. 30, 1989, Pat. No. 4,922,950.

[51] Int. Cl.⁵ .............................................. F16K 5/04
[52] U.S. Cl. ................................... 137/316; 137/454.6
[58] Field of Search .................. 137/316, 454.5, 454.6, 137/625.31; 251/312

[56] References Cited

U.S. PATENT DOCUMENTS

| | | | |
|---|---|---|---|
| 2,658,715 | 11/1953 | Kistner | 137/454.6 |
| 3,123,091 | 3/1964 | Elsey | 137/270 |
| 3,411,530 | 11/1968 | Powell | 137/454.6 |
| 3,563,512 | 2/1971 | Hauffe | 251/312 |
| 3,788,601 | 1/1974 | Schmitt | 137/454.6 |
| 3,831,621 | 8/1974 | Anthony et al. | 137/625.31 |
| 4,331,176 | 5/1982 | Parkison | 137/454.6 |
| 4,651,770 | 3/1987 | Denham et al. | 137/454.5 |
| 4,678,002 | 7/1987 | Valley | 137/454.5 |
| 4,738,277 | 4/1988 | Thomas | 137/625.31 |
| 4,771,805 | 9/1988 | Maa | 137/454.6 |

*Primary Examiner*—Stephen M. Hepperle
*Attorney, Agent, or Firm*—Robert K. Rhea

[57] ABSTRACT

In a right angle body fluid flow restrictor valve having a flow passageway between its ports opened and closed by superposed multiple orifice discs controlled by a yoke connected with one of the discs and having a yoke stem projecting outwardly of the valve body through a valve body bonnet. A sleeve cage nested by a valve body counterbore intersects the passageway and surrounds the yoke and discs. The valve bonnet, yoke, sleeve cage and discs form a unitized assembly easily removed from and reinserted into the valve body for repair or replacement of worn valve components without disconnecting the valve body from a flow line. The unitized assembly components are fail-safe indexed with each other, the valve body and valve control to insure a selected open, closed or partially open flow passageway through the valve.

3 Claims, 2 Drawing Sheets

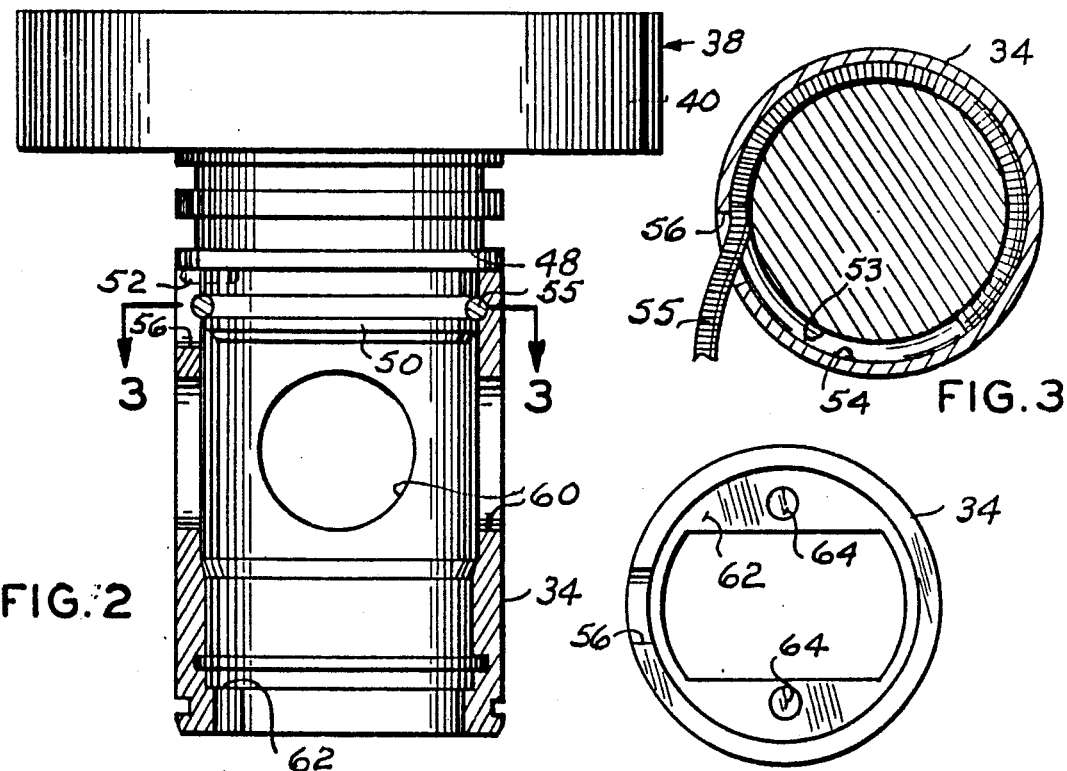
FIG. 2
FIG. 3
FIG. 5
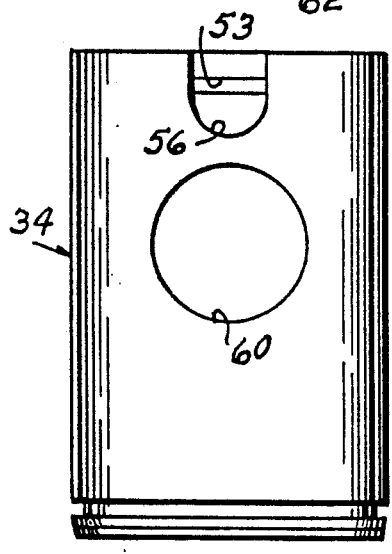
FIG. 4
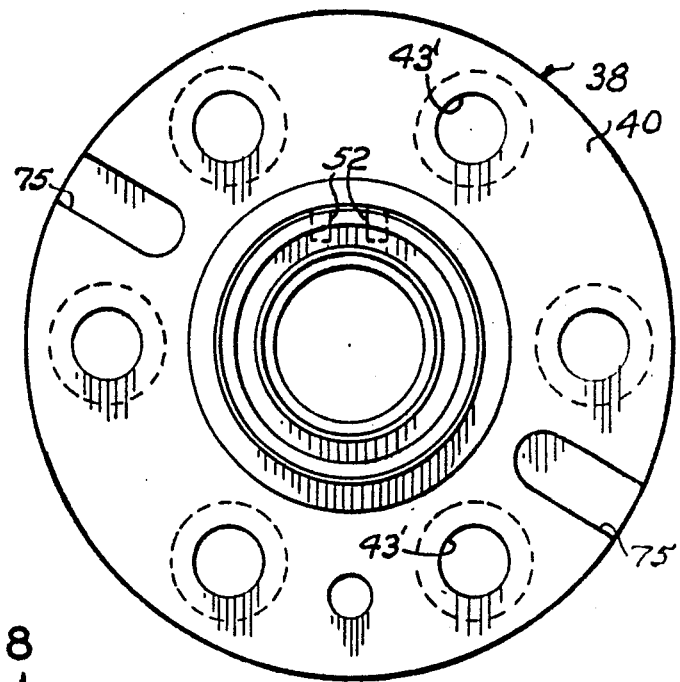
FIG. 6
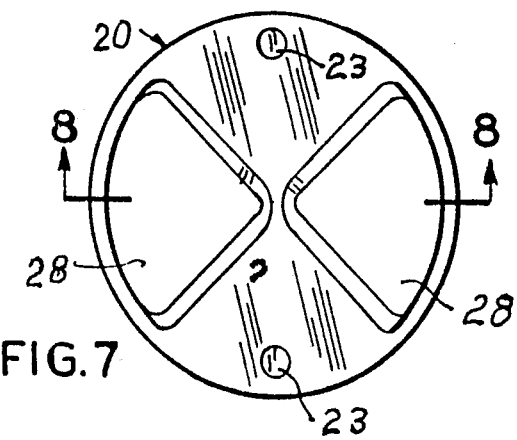
FIG. 7
FIG. 8

# UNITIZED DISC FLOW CONTROL ASSEMBLY FOR A RESTRICTOR VALVE

CROSS REFERENCE TO RELATED APPLICATION

This application is a continuation-in-part of an application filed by me in the United States Patent and Trademark Office on Jan. 30, 1989, under Serial No. 07/303 now Patent No. 4,922,950, for Unitized Disc Flow Control Assembly for a Restrictor Valve.

BACKGROUND OF THE INVENTION

1. Field of the invention.

The present invention relates to fluid flow control valves of the right angular type and more particularly to a unitized assembly of valve flow control discs and components.

Flow restrictor valves, utilizing a pair of discs having mating and mismating multiple orifices for restricting the flow rate through the valve, are highly satisfactory and in general use. When the discs must be replaced, as a result of being worn by fluid contained abrasive, it has been necessary to stop the fluid flow through the valve both upstream and downstream in order to remove the valve body from its connection with the flow line in order to disassemble the valve components and replace worn discs. This has been a time consuming process as well as an economic loss due to the interruption of fluid flow.

This invention eliminates the necessity of removing the valve body from the line to replace the control flow discs by unitizing the discs and their supporting components which may be manually removed from and inserted into the valve body as a unit.

2. Description of the prior art.

I do not know of any patents disclosing the feature of providing a replaceable unitized disc control flow assembly for a right angular flow restrictor discs valve body.

SUMMARY OF THE INVENTION

A flow restrictor valve, having an elongated centrally bored and counterbored body for forming a fluid port at one end and receiving flow control discs in the counterbore, is provided with a lateral or right angular port forming a fluid passageway across the position of the mated or mismated flow control discs. The discs are axially disposed in one end of a sleeve-like cage having a wall port in register with the lateral port. A centrally bored flanged top valve bonnet is secured to the valve body in the outward end portion of its counterbore. The bonnet axially supports a yoke pinned to one rotatable flow control disc. The inward end portion of the bonnet is inserted into and joined to the adjacent end portion of the sleeve cage by a helical wire retainer within cooperating semicircular grooves in the overlapped portion of the bonnet and sleeve wall. Index pins in the bonnet and valve body reference the components with each other to insure a selected open or closed fluid passageway. An indexed position control handle and valve top, is secured to the end portion of the yoke stem projecting through the bonnet.

The principal object of this invention is to provide a unitized assembly of components controlling the mated and mismated position of flow restrictor discs in a right angular valve body which may be inserted into and removed from the valve body as a unit without disconnecting the valve body from a fluid conducting line.

BRIEF DESCRIPTION OF THE DRAWINGS

FIG. 2 is an elevational view of the bonnet and a vertical cross section of the sleeve rotated 180° about its vertical axis from its position in FIG. 1;

FIG. 3 is a horizontal cross sectional view taken substantially along the line 3—3 of FIG. 2, illustrating the manner of inserting or removing the connecting wire retainer;

FIG. 4 is an elevational view of the right side of the sleeve as viewed in FIG. 1;

FIG. 5 is a top view of the sleeve, per se, rotated 90° clockwise from its position in FIG. 4;

FIG. 6 is a bottom view of the valve bonnet, per se, as shown in FIG. 2;

FIG. 7 is a top view of one rotatable disc, per se;

FIG. 8 is a vertical cross sectional view taken substantially along the line 8—8 of FIG. 7; and, FIG. 9 is a vertical cross sectional view taken substantially along the line 9—9 of FIG. 1.

DESCRIPTION OF THE PREFERRED EMBODIMENTS

Figures 1, 9:
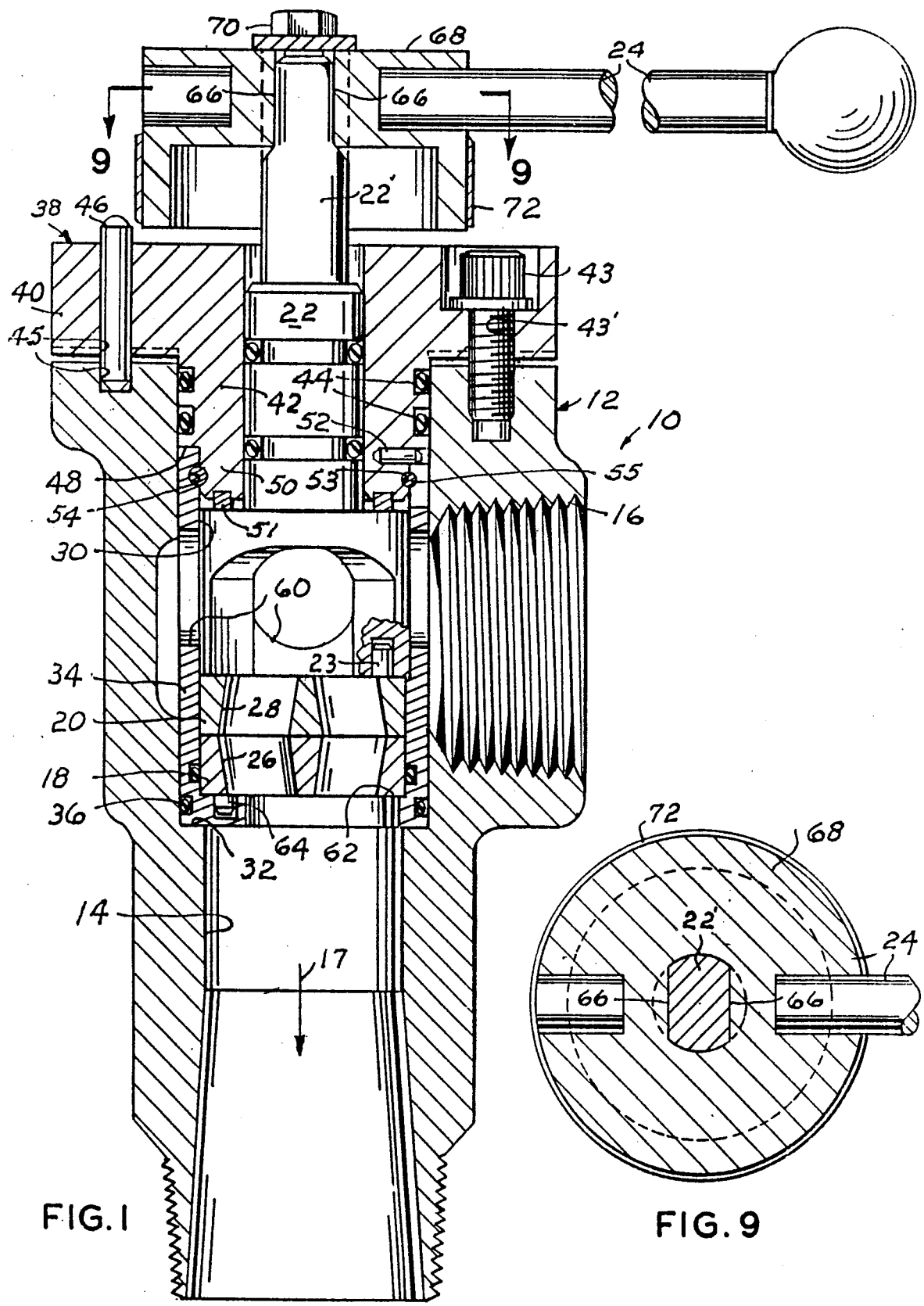
FIG. 1 is a vertical cross sectional view of the valve.

Like characters of reference designate like parts in those figures of the drawings in which they occur.

In the drawings:

The reference numeral 10 indicates a flow restrictor valve having a valve body 12 commonly referred to as "right angle valve" characterized by a first inline flow port 14 and its second flow port 16 disposed intermediate the length of the body 12 with its axis normal to the first port 14 and forming a fluid passageway with flow assumed to be in the direction of the arrow 17. This restrictor valve is characterized by mating and mismating discs 18 and 20 disposed in contiguous face to face contact axially of the flow port 14. A yoke 22, axially secured by pins 23, only one being shown (FIG. 1), to the disc 20, includes a stem portion 22' which projects axially outwardly of the valve body for connection with a control handle 24 for angularly rotating the disc 20 relative to the disc 18 for mating or mismating the disc ports 26 and 28 (FIGS. 1 and 7) in a conventional manner. The above description is substantially conventional with right angular flow restrictor valves and is set forth to show the combination of valve components which are unitized in this invention as will now be explained.

The valve body top or head end, as viewed in FIG. 1, is counterbored opposite the port 14, as at 30, forming an annular shoulder 32 facing upstream and spaced downstream beyond the downstream limit of the lateral port 16. The counterbore 30 loosely receives axially a sleeve 34 having one end portion sealed with the counterbore wall adjacent the shoulder 32 by an O-ring 36. The other end of the sleeve 34 terminates in the body counterbore above the lateral port 16 intersection with the counterbore 30 and in spaced relation with respect to the head end of the valve body.

A valve bonnet 38 having a bolt circle hole equipped annular flange 40 overlies the valve head end, in close spaced relation for the reason presently apparent, with its step diameter reduced stem 42 entering the counterbore 30 and sleeve 34. O-rings 44 seal the bonnet stem with the wall forming the counterbore. Bolts 43, only one being shown (FIG. 1), in the bolt holes 43' join the bonnet to the body. The bonnet flange 40 and body top end surface are line drilled, as at 45, for receiving an indexing pin 46.

Adjacent its shoulder 48 defining its innermost diametrically reduced end portion 50 the bonnet is provided with a pair of radial circumferentially spaced outstanding sleeve cage index pins 52 for the purpose presently explained.

Below the horizontal plane of the index pins 52 the reduced end portion 50 of the bonnet is provided with a circumferential, semicircular in toric cross section, groove 53 and the inner periphery of the top end portion of the sleeve 34 is similarly provided with a cooperating semicircular groove 54 forming an annular void, circular in transverse toric cross section, between the bonnet and sleeve for nesting a length of helically coiled malleable wire 55 inserted into the void in the manner presently explained.

The mating tolerance between the bonnet end portion 50 and adjacent end of the sleeve 34 and wire 55 contained therebetween is such that the bonnet may be manually inserted into and indexed with the sleeve 34 during the subassembly thereof. As shown by FIG. 4, the upper end portion of the sleeve wall is provided with a vertical wall slot 56 at a selected location open through its top edge for slidably receiving the sleeve indexing pins 52 projecting outwardly from the bonnet.

The sleeve 34 is provided with lateral bores 60 with one bore 60 in vertical alignment with and spaced downwardly from the recess 56 cooperatively concentric with the axis of the port 16 and is maintained in this position by the indexing pins 52 and 46.

The downstream end of the inner wall surface of the sleeve 34 is provided with an annular upstream facing shoulder 62 which supports the disc 18 which is secured thereto by dowellike pins 64, only the bottom end portion of one being shown, (FIG. 1). The disc 18 is sealed with the inner wall surface of the sleeve 34 by an 0-ring in a conventional manner.

The depending end surface of the bonnet reduced end portion 50 is provided with a concentric annular groove 40 which cooperatively receives an annular bearing 51 depending from the bonnet end surface for bearing against the yoke and impinging the depending end surface of the yoke 22 against the superposed disks 20 and 18 in turn seated on the shoulder 62 when the bolts 43 are tightened.

The outwardly projecting stem end 22' of the yoke 22 is provided with opposing wrench flats 66 cooperatively nested by a broached central opening in a valve top 68. The valve top is secured to the stem 22' by a nut 70. The handle 24 projects laterally from the valve top 68.

An index guide 72, surroundingly secured to the valve top cooperates with indicia or the indexing pin 46, projecting above the flange 40, for visually indicating the mated or mismated position of the disc 20 relative to the disc 18.

The sleeve 34 is assembled with the valve bonnet 38 with the yoke 22 previously placed in the latter by manually positioning the bonnet end portion 50 in the sleeve with the indexing pins 52 disposed within the sleeve recess 56. As illustrated by FIG. 3, one end of the wire 55 is manually inserted through the recess 56 in a tangential direction relative to the inner periphery of the sleeve and adjacent portion of the bonnet 38. As the wire 55 is manually inserted it easily assumes a circular configuration by sliding along the confines of the mating grooves 53 and 54 until its inserted end is visible in the recess 56. The wire 55 is then cut-off adjacent one side of the recess so that both its ends are nested by the grooves.

OPERATION

In operation, assuming the removable valve components, bonnet 38, yoke 22, discs 18 and 20 and surrounding sleeve 34 have been installed in an operative position as unit, as illustrated by FIG. 1. When it is evident that one or both of the discs 18 or 20 must be replaced as a result of abrasive fluid wearing the discs the fluid flow through the passageway 17 is discontinued and the pressure is bled off. The valve bonnet bolts 43 are removed after removing the nut 70 and valve top 68. The bottom surface of the flange 40 is provided with a pair of diametrically opposite radial recesses 75 (FIG. 6) for inserting a tool such as a screwdriver, not shown, under the flange 40 in a fulcrum action against the body top in order to separate the bonnet from the valve body 12. The bonnet and its unitized assembly is then axially removed from the body counterbore 30. Thereafter a replacement or new unitized valve assembly, as described hereinabove, may be axially inserted into the valve counterbore with the index pin 46 serving as a reference for desired orientation of the sleeve relative to the flow passageway 17. Similarly the yoke stem wrench flats 66, in combination with the indexing guide 72 positions the yoke 22 and disc 20 in desired registration with the stationary disc 18.

Alternatively, the discs 18 and 20 may be replaced in the original unitized assembly by removing the wire 55 from the cooperating groove connecting the sleeve to the bonnet by grasping one visible end of the wire and removing it from the cooperating grooves 53 and 54 in a sliding action relative to the bonnet and sleeve 34 thus permitting removal of the yoke 22 and discs 18 and 20 from the sleeve 34. New discs are then installed and the repaired unit installed as described hereinabove.

Obviously the invention is susceptible to changes or alterations without defeating its practicability. Therefore, I do not wish to be confined to the preferred embodiment shown in the drawings and described herein.

I claim:

1. In a flow restrictor valve having its body counterbored opposite one valve port defining an annular outwardly facing shoulder for receiving superposed multiple orifice discs adjacent the shoulder in face to face axial alignment with said one port, said body having a lateral port communicating with the counterbore, the improvement comprising:
   cage means including a sleeve within and normally sealing with
   the counterbore adjacent said annular shoulder and surrounding said discs,
      said sleeve having a wall port axially communicating with the lateral port and having an annular groove in its inner wall surface end portion opposite the discs and a recess in its end surface opposite the discs intersecting the groove;
   a valve bonnet having an end portion disposed within said sleeve and closing the counterbore end portion opposite said shoulder,
      said one end portion of said valve bonnet having an annular groove cooperatively aligned with the sleeve annular groove;
   elongated strand means nested by the cooperating grooves for connecting said bonnet to said sleeve;

yoke means axially connected with the disc opposite said one port and having a yoke stem projecting beyond said valve body at the outer end of the counterbore for angular rotation of one disc relative to the other disc;

valve top means secured to and surrounding aid yoke stem for angularly rotating said yoke; and, indexing means for referencing the position of the sleeve to the bonnet, the bonnet to the valve body and the valve top to the yoke and bonnet.

2. The combination according to claim 1 and further including:

friction reducing means interposed between said yoke means and said valve bonnet means for impinging said discs against said shoulder.

3. In a multiple orifice disc flow restricting valve having its body counterbored opposite one valve inlet port defining an annular upstream facing shoulder, said body having a lateral port communicating with the counterbore to complete a flow passageway, the improvement comprising:

valve bonnet and sleeve means, including cooperating multiple orifice flow control discs, axially inserted as a unit into and closing said counterbore and sealing with the counterbore wall for controlling the volume of fluid through the passageway;

strand means separably joining said sleeve means to the valve bonnet; and, index pins in said valve bonnet for angularly positioning said bonnet and said sleeve relative to said valve body in a predetermined position.

* * * * *